(12) United States Patent
Hawthorne et al.

(10) Patent No.: US 9,365,222 B2
(45) Date of Patent: *Jun. 14, 2016

(54) DISTRIBUTED TRAIN INTELLIGENCE SYSTEM

(71) Applicant: New York Air Brake, LLC, Watertown, NY (US)

(72) Inventors: Michael J. Hawthorne, Watertown, NY (US); Marshall G. Beck, Fineview, NY (US)

(73) Assignee: New York Air Brake, LLC, Watertown, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/301,402

(22) Filed: Jun. 11, 2014

(65) Prior Publication Data

US 2014/0288734 A1    Sep. 25, 2014

Related U.S. Application Data

(63) Continuation of application No. 13/893,842, filed on May 14, 2013, now Pat. No. 8,761,974, which is a continuation of application No. 12/091,196, filed as application No. PCT/US2007/060036 on Jan. 3, 2007, now Pat. No. 8,457,817.

(60) Provisional application No. 60/772,569, filed on Feb. 13, 2006.

(51) Int. Cl.
*B61L 3/00* (2006.01)
*B60T 13/66* (2006.01)
*B60L 15/00* (2006.01)
*B61L 25/02* (2006.01)
*B61C 17/12* (2006.01)
*B61L 15/00* (2006.01)

(52) U.S. Cl.
CPC ............... *B61L 3/008* (2013.01); *B60T 13/665* (2013.01); *B61C 17/12* (2013.01); *B61L 3/006* (2013.01); *B61L 15/0027* (2013.01); *B61L 15/0036* (2013.01); *B61L 15/0054* (2013.01); *B61L 15/0081* (2013.01); *B61L 25/02* (2013.01); *B61L 25/025* (2013.01)

(58) Field of Classification Search
CPC ... B60T 13/665; B61L 3/006; B61L 15/0027; B61L 15/0036; B61L 25/02; B61L 15/0081; B61L 25/025; B61L 3/008; B61L 15/0054; B61C 17/12
USPC .................... 701/19–20, 70, 208; 246/167 R, 246/182 R–182 C, 186–187 C; 104/88.01–88.04
See application file for complete search history.

(56) References Cited

U.S. PATENT DOCUMENTS 8,457,817 B2 * 6/2013 Hawthorne ........... B60T 13/665 701/19
8,761,974 B2 * 6/2014 Hawthorne ........... B60T 13/665 701/19

*Primary Examiner* — Bao Long T Nguyen
(74) *Attorney, Agent, or Firm* — Bond Schoeneck and King PLLC; David Nocilly

(57) ABSTRACT

A system and method which may include on each locomotive a propulsion system and a braking system, a transceiver for communication between the locomotives, and sensors for sensing operational conditions on the locomotive. A processor receives the sensed operation conditions, communicates information including the sensed operational conditions to the other locomotive, determines a propulsion or braking value or command based on the sensed operational conditions, pre-selected criteria and the information received from the other locomotive, and outputs the propulsion or braking value or command.

16 Claims, 4 Drawing Sheets

DISTRIBUTED TRAIN INTELLIGENCE SYSTEM

CROSS-REFERENCE TO RELATED APPLICATIONS

The present application is a continuation of U.S. Non-Provisional application Ser. No. 13/893,842, filed on May 14, 2013, which was a continuation of application Ser. No. 12/091,196, filed on Apr. 23, 2008, now U.S. Pat. No. 8,457,817, which was a national stage application of PCT PCT/US07/60036, filed on Jan. 3, 2007, which claimed priority to U.S. Provisional Application No. 60/772,569, filed on Feb. 13, 2006.

BACKGROUND OF THE INVENTION

1. Field of the Invention

The present invention relates generally to a distributed power system and more specifically to an intelligent distributed power system.

2. Description of the Related Art

The distributed power system generally includes a master locomotive setting throttle/brake and transmitting information to slave locomotives to set their throttle/brakes. An early system is disclosed in U.S. Pat. No. 3,380,399 to Southard et al. The ability of the remote locomotive to receive a throttle command from the master locomotive and make a modification to conserve fuel in a train consists is described in U.S. Pat. No. 4,344,364 to Nickles et al. The ability of the remote locomotive to transmit back diagnostic information is described in U.S. Pat. No. 5,570,284 by Roselli et al. The distributed power settings being determined at and transmitted from the master unit to a slave unit based on the topography and location of the master and slave units is described in U.S. Pat. No. 6,144,901 to Nickles et al., as well as U.S. Pat. No. 5,950,967 to Montgomery.

BRIEF SUMMARY OF THE INVENTION

The present system includes on each locomotive a propulsion system and a braking system; a transceiver for communication between the locomotives; and sensors for sensing operational conditions on the locomotive. A processor receives the sensed operational conditions, communicates information including the sensed operational conditions to the other locomotive, determines a propulsion or braking value/command based on the sensed operational conditions, pre-selected criteria, and the information received from the other locomotive, and outputs the propulsion or braking value/command.

The processor may determine and communicate to the other locomotives as part of the information an initial propulsion or braking value based on the sensed operational conditions, pre-selected criteria and sensed operation conditions received from the other locomotive; and the processor determines a final propulsion or braking value/command based on the sensed operational conditions, the pre-selected criteria and the information received from the other locomotive.

The present method of controlling the propulsion and braking systems of each locomotive includes receiving sensed operational conditions of the locomotive; communicating information including the sensed operational conditions to the other locomotive; determining a propulsion or braking value/command based on the sensed operational conditions, pre-selected criteria and the information received from the other locomotive; and controlling the propulsion and braking system using the propulsion or braking value/command.

The determining of a propulsion or braking value/command may include determining and communicating to the other locomotive as part of the information an initial propulsion or braking value based on the sensed operational conditions, pre-selected criteria and sensed operation conditions received from the other locomotive; and determining a final propulsion or braking value/command based on the sensed operational conditions, the pre-selected criteria and the information received from the other locomotive.

The present system includes on each locomotive a propulsion system and a braking system; a transceiver for communication between the locomotives; and a location determining device and a storage of track topology. A processor determines and communicates to the other locomotive as information an initial propulsion or braking value using the topology of the present and projected location of the locomotive and pre-selected criteria, determines a final propulsion or braking value/command based on the initial value and the information received from the other locomotive, and outputs the final propulsion or braking value/command.

The system may include sensors for sensing operational conditions and the processor receives and communicates the sensed operational conditions as information including the sensed operational conditions to the other locomotive. The processor determines one of the initial and final propulsion or braking values based on the sensed operational conditions, pre-selected criteria, topology, and the information received from the other locomotive.

The present method of controlling the propulsion and braking systems of each locomotive includes determining topology of the present and projected location of the locomotive; determining and communicating to the other locomotive as information an initial propulsion or braking value using the topology of the present and projected location of the locomotive and pre-selected criteria; determining a final propulsion or braking value/command based on the initial value and the information received from the other locomotive; and controlling the propulsion and braking system using the propulsion or braking value/command.

The method may include receiving and communicating as information sensed operation conditions of the locomotive; and determining one of the initial and final propulsion or braking values/command based on the sensed operational conditions, pre-selected criteria, topology, and the information received from the other locomotive.

Other objects, advantages and novel features of the present disclosure will become apparent from the following detailed description when considered in conjunction with the accompanying drawings.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
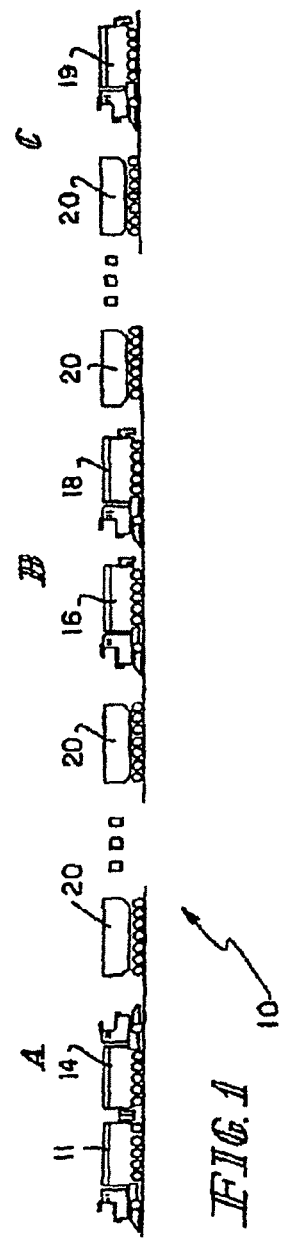
FIG. 1 is schematic view of a train which incorporates the intra-train communication network of the present system.

As shown in FIG. 1, train 10 includes a plurality of locomotives 11, 14, 16, 18 and 19 in a train with a plurality of cars 20. Locomotive 11 and 14 form a consist A, locomotives 16 and 18 form a consist B and locomotive 19 forms a consist C. One of the locomotives is designated a lead locomotive and the others are considered trail and/or remote locomotives. In the industry, if locomotive 11 is the lead, locomotives 16 and 19 are remote and locomotives 14 and 18 are trail.

Using the train as shown in FIG. 1, locomotives 11, 16 and 19 would have LEADER systems which would independently make decisions. Since 14 is connected to 11, it can receive its control information directly from 11. Similarly 18 even though it is not interconnected to 16 as a multi-unit consist it may also either receive its information from 16 or also be LEADER equipped. As an alternative, all the locomotives 11, 14, 16, 18 and 19 may have a LEADER equipment type system onboard.

The lead locomotive, that locomotive having an engineer at the controls, communicates commands and controls to the remote locomotives. The lead and remote locomotives communicates commands and controls to their trail locomotives. Typically, the lead and remote locomotive communicate by radio while they communicate to their respective trail locomotives over a wire. The commands and controls may include, for example, setting the direction control, setting the throttle, set up dynamic braking, set up the operating modes, interlock dynamic brakes, as well as turning on and off various ancillary functions. The trail locomotives transmit status messages or exception message back to the lead locomotive. The status may include locomotive identification, operating mode and tractive-braking efforts. The exception message includes various faults such as wheel slip, locomotive alarm indicator, incorrect brake pressure, low main reservoir pressure, throttle setting, etc.

Each of the locomotives includes a transceiver to transmit and receive messages. While the preferred embodiment will be described with respect to radio frequency communication between the locomotives or at least between the locomotive consists, if not between all locomotives, the same principles can be applied to communication along a wire where multiple communications may be taking place. Thus, for example, if there is a wire running throughout the train through locomotives 11, 14, 16, 18 and 19 and cars 20, and the locomotives form one network and the cars form another network, the same method may be used to allow private communication in either of the networks.

Math models of a LEADER System, monitors parameters and performs calculations based on the current energy state of the train to create a real-time display of train dynamics. The power of LEADER system resides in its ability to provide information allowing the crew to better control the train, minimizing loss of energy. Loss of energy via over-braking represents fuel unnecessarily consumed. Energy imparted to the cargo of the train represents potential damage to lading, equipment and rail. Both phenomena are undesirable and addressable with the LEADER system from New York Air Brake Corporation. Although the LEADER system will be used to describe the present system and method, any other processors or systems with the same capabilities may be programmed to perform the present method.

Figure 2:
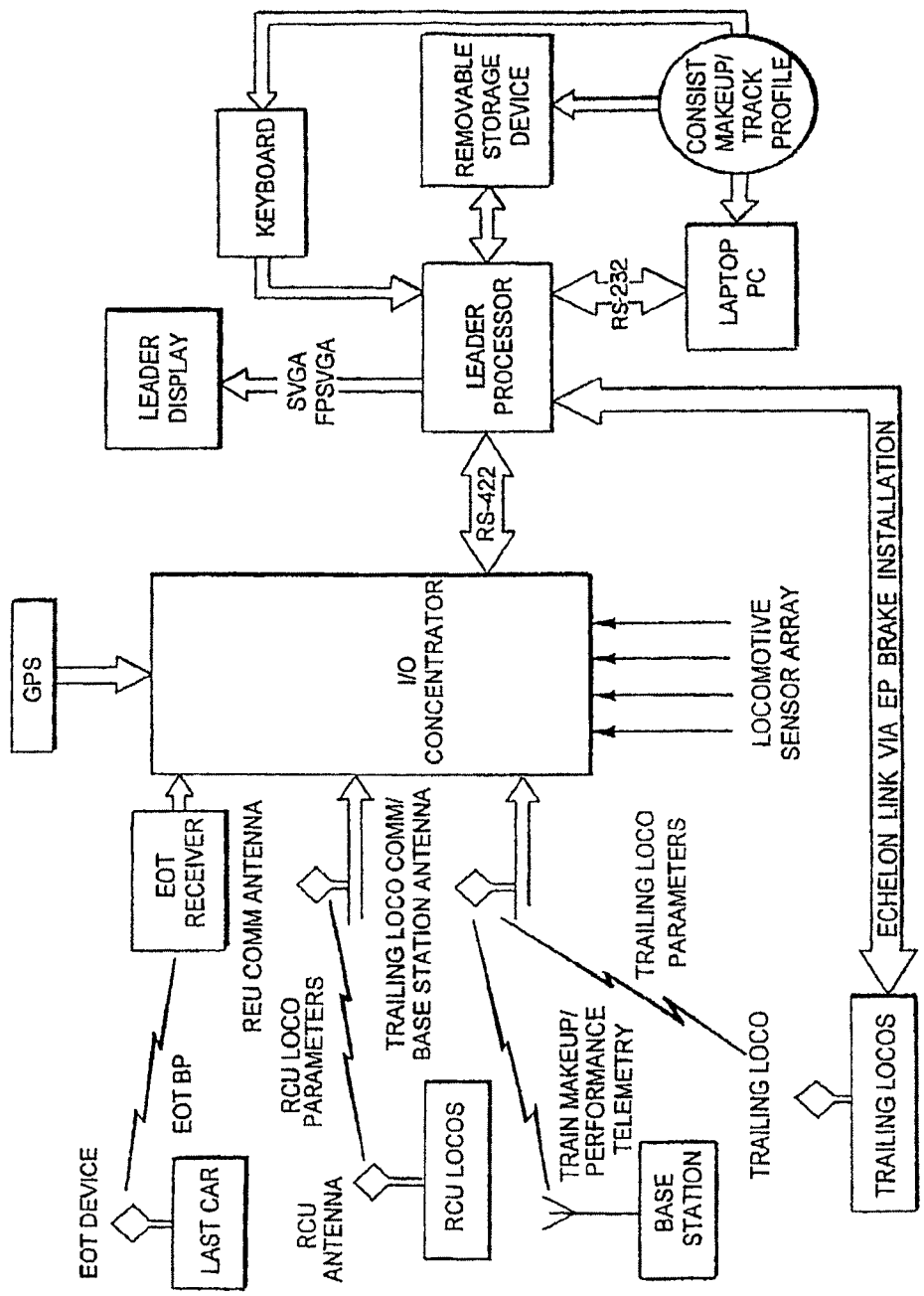
FIG. 2 is a block diagram of the system components of a locomotive assist display and event recorder system according to the principles of the present system.

The LEADER system is comprised of a number of subsystems each with specific duties. FIG. 2 shows a generic LEADER architecture. The user interface of the LEADER system is the real-time display which shows a graphical and numerical representation of the current state of the train as shown in FIG. 5 of U.S. Pat. No. 6,144,901, which is incorporated herein by reference. Radio communication is established between the lead locomotive, the trailing locomotives in the lead consist, and locomotives in the remote consist to report the necessary parameters from each of these locomotives necessary to perform LEADER calculations. Consist information is entered via the key pad on the real-time display, a wired communication source (laptop PC or removable storage device) or via wayside radio communication. Position is determined from wheel movement sensors and a Global Positioning System (GPS). The Input/Output (I/O) Concentrator gathers all of the various locomotive parameters necessary for LEADER algorithm calculations and reports the information to the LEADER Computer. The LEADER Processor, a high throughput capacity computer platform using a Real Time Operating System (RTOS), then performs the calculations required by the LEADER algorithms and the real-time display is updated. All of these sub-systems combine to form the LEADER System.

Each locomotive in a LEADER train will require at a minimum, the I/O Concentrator with communication capability to the head end. A LEADER Processor and Display are only required for the lead locomotive. Tuning algorithms may alleviate the need for I/O Concentrators on each locomotive.

The LEADER system is capable of three operating modes, each building on the previous mode. The three modes advance the LEADER system from a real-time display passively providing information to the locomotive engineer (information only mode) to a LEADER system that will make suggestions to the locomotive engineer on how to better handle the train (driver assist mode) and finally to a control system that is capable of issuing commands to optimally control the locomotive (cruise control mode).

In the information only mode, the locomotive engineer makes all of the decisions and solely activates the various control systems in a manual mode. The LEADER system provides information to the engineer that is not currently available to him/her to use to manage various locomotive control systems. In driver assist mode, the LEADER system determines and displays the optimum locomotive power dynamic brake throttle setting and the locomotive and car brake control settings. These settings are determined at the head end locomotive for the head end locomotives and the remotely controlled locomotives. These recommendations or desired settings are displayed to the locomotive engineer who can then elect to manually move the various controls to achieve these settings. In the cruise control mode, LEADER derived settings are used to automatically control the locomotive power and braking systems, the train brake system of each car and ancillary systems which effect train movement. The locomotive engineer serves as an operational supervisor with the ability to manually override the cruise control. Cruise control can also be produced by communication links between the LEADER and the railroad central traffic control center.

The development of LEADER began over 20 years ago with early efforts to create the Train Dynamics Analyzer (TDA), a computer math model used to predict in-train forces. The train dynamic modeling techniques and algorithms embodied in the TDA are described in U.S. Pat. No. 4,041,283.

For distributed control in the classic LEADER system, processing is centralized in a single, lead locomotive. Although the other locomotives may have processors, the processors are subordinate to the lead locomotive. The lead locomotive has a processing node that is in communication with other locomotives in the train via radio. In this processing mode, a LEADER processor issues commands to all locomotives from the centralized, lead processor node and actuated locally.

In the present system and method, LEADER processing can be distributed across some or all locomotives in the train, each with a processing node in communication with other processing nodes on other locomotives in the train. This architecture creates a set of peer processors rather than a lead/subordinate arrangement. The communication between processing nodes serves two purposes. The first purpose is to gather and collect required data to itself representing the operating state or operating conditions of each locomotive. Each distributed processing node uses the state of all locomotives to arrive at a control solution that best meets the goal of the train movement. Each processing node is capable of locally actuating the commands required to achieve its control solution. The processing node will be in communication with the other nodes which are also arriving at a control solution. The nodes can have the ability to compare the solutions that it found locally with the other peer nodes and collectively vote on or propose the solution. After voting, the nodes can advise each other if consensus is reached or not. If no consensus is reached, the process may be restarted automatically, by the operator or overridden by the operator.

This system distinguishes itself from the classic, centralized approach to train control by allowing each locomotive, based on a full understanding of the train behavior, to arrive at a local control solution to optimize performance. It further provides for each control node to compare its solution with those of the other nodes in the train to reach consensus on the overall train control strategy. Each processing node would have knowledge of the operating goal set including weighted criteria (time, fuel, forces, etc.) and constraining limits (in-train forces, speed limits, stall speed, etc.). Each processing node would also employ tuning algorithms to match LEADER's train dynamic models to the current environment. The tuning is described in US published patent application US 2004-0093196-A1, which is incorporated herein by reference The present system includes on each locomotive a propulsion system and a braking system; a transceiver for communication between the locomotives; and sensors for sensing operational conditions on the locomotive. A processor performs the method illustrated in FIG. 3. It receives the sensed operation conditions as information at step 20. It communicates information including the sensed operational conditions to the other locomotive at step 22. It determines a propulsion or braking value/command based on the sensed operational conditions, pre-selected criteria and the information received from the other locomotive at step 24. The propulsion or braking value/command is outputted at step 26. This may be to a display for control by the operator or to automatically control the propulsion or brake systems. Whereas the lead locomotives can operate in all three modes (information, driver assist, cruise control), the other locomotive can only operate in the cruise control modes and thus issue commands. Thus in the present system and method, each locomotive makes an independent decision based on information that it and other locomotives have collected.

Figure 3:
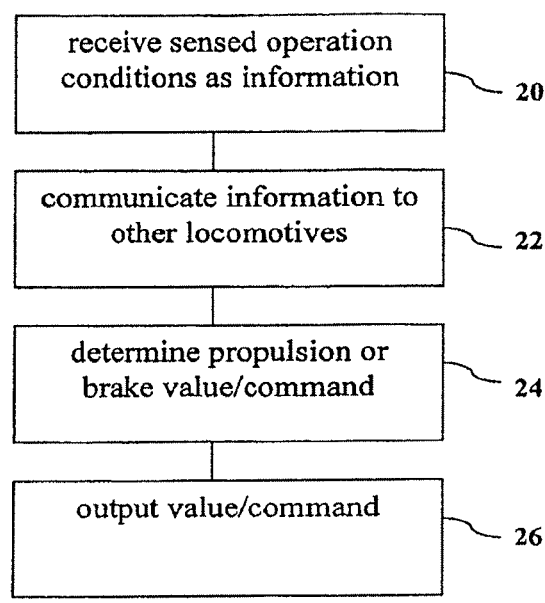
FIG. 3 is a flow chart of one embodiment of the present method.
Figure 4:
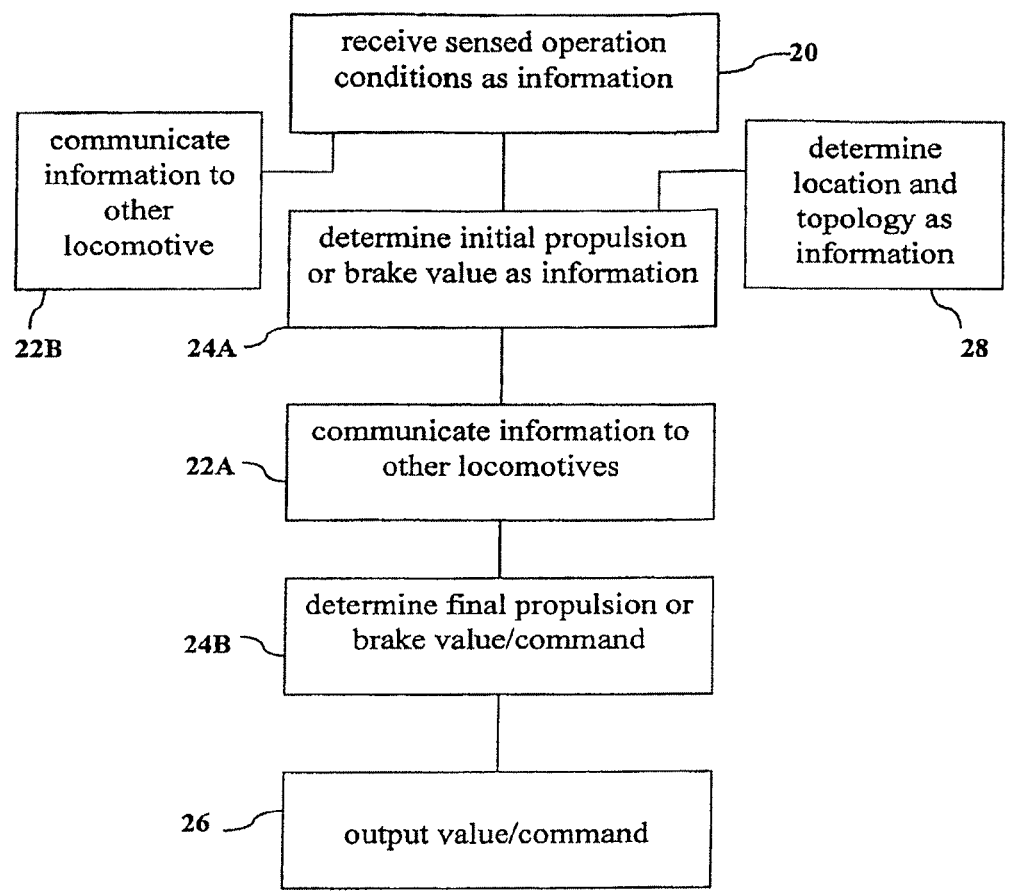
FIG. 4 is a flow chart of another embodiment of the present method.

FIG. 4 illustrates a modification of the method of FIG. 3. Where appropriate, the same reference numbers have been used. The processor receives the sensed operation conditions as information at step 20. It determines its location and the topology of the track at present and projected location of the locomotive at step 28. The processor determines an initial propulsion or braking value as information based on the sensed operational conditions, pre-selected criteria and/or the topology of the track at present and projected location of the locomotive at step 24A. It communicates information including the sensed operational conditions and/or initial propulsion or braking value to the other locomotive at step 22A. It determines a final propulsion or braking value/command based on the sensed operational conditions, pre-selected criteria and the information received from the other locomotive at step 24B. The propulsion or braking value/command is outputted at step 26.

The initial propulsion or braking value may use only the sensed operational conditions or the topology of the track at present and projected location of the locomotive at step 24A with the pre-selected criteria. As shown by step 22B, operational conditions may be communicated to the other locomotive before the determination of the initial propulsion or braking value at step 24A, and thus can be used in making the initial value determination.

Although the present invention has been described and illustrated in detail, it is to be clearly understood that the same is by way of illustration and example only and is not to be taken by way of limitation. The scope of the present invention is to be limited only by the terms of the appended claims.

What is claimed is:

1. An intelligent distributed power system for a train, comprising:
    a first processor associated with a first locomotive in the train, wherein the first processor is configured to receive sensed operation conditions from at least one sensor on the first locomotive in the train, to communicate information including the sensed operational conditions to a second processor associated with a second locomotive included in the train, to determine a propulsion or braking command based on the sensed operational conditions, a set of pre-selected criteria and any information including sensed operation conditions that is received from the second processor of the second locomotive included in the train, and to output the propulsion or braking command to a propulsion or a braking system, respectively, of the first locomotive;
    wherein the first processor associated with the first locomotive is configured to interact with the second processor of the second locomotive in the train in a peer relationship,
    wherein the first processor is programmed to find a local control solution that best meets the goal of train movement based on the sensed operational conditions of the first locomotive, the set of pre-selected criteria, and any information including sensed operation conditions that is received from the second processor of the second locomotive, and
    wherein the first processor is programmed to control local actuation of locomotive commands required to achieve the local control solution,
    wherein the first processor is programmed to communicate with the second processor of the second locomotive, to compare its local control solution with any local control solution of the second processor to collectively formulate a consensus on an overall train control solution for actuation by the first and the second locomotives.

2. The processor of claim 1, wherein the processor located on each of the first and second locomotives compares its initial propulsion or braking value with any received initial propulsion or braking value from the other of the first and second locomotives to determine if there is a discrepancy there between before determining the overall train control solution.

3. The processor of claim 1, wherein each of the first and second locomotives includes a location determining device and the processor located on each of the first and second locomotives communicates the location as part of the information to the other of the first and second locomotives and determines the propulsion or braking command using the sensed operational conditions, the pre-selected criteria, the determined location and the information received from the other of the first and second locomotives.

4. The processor of claim 1, wherein each of the first and second locomotives includes a location determining device and a storage of track topology and the processor located on each of the first and second locomotives determines the propulsion or braking command using the topology of the present and projected location of that locomotive.

5. The processor of claim 1, wherein the processor located on each of the first and second locomotives outputs the propulsion or braking command to the propulsion or braking systems of that locomotive as a control input.

6. The processor of claim 1, wherein each of the first and second locomotives includes a display and the processor located on each of the first and second locomotives outputs the propulsion or braking value to the display.

7. The processor of claim 1, wherein the operational conditions include one or more of speed, coupler forces, slack action, propulsion setting and braking setting.

8. The processor of claim 1, wherein the processor located on each of the first and second locomotives includes a train dynamic model program to determine the propulsion or braking command and estimated train operational conditions using initial train parameters and the processor located on each of the first and second locomotives compares the sensed and the estimated operational conditions and adjusts the initial train parameter as necessary based on the comparison.

9. A method of analyzing operation of a locomotive, the method comprising:
receiving sensed operation conditions on a first locomotive from at least one sensor on the first locomotive;
communicating information including the sensed operational conditions to a second locomotive included in the train;
determining a propulsion or braking command based on the sensed operational conditions, pre-selected criteria and information received from the second locomotive included in the train; and
outputting the propulsion or braking command to a respective propulsion or braking system of the first locomotive,
wherein a processor located on each of the first and second locomotives in the train interacts with the processor on the other of the first and second locomotives in the train in a peer relationship, wherein each processor receives required data representing the operating state or operating conditions for each of the first and second locomotives and uses that data to locally find a control solution, and
wherein each processor controls local actuation of locomotive commands required to achieve the control solution, each processor is in communication with the other processors which also arrive at their own control solution, each processor is configured to compare its local control solution with the control solution of the processor of the other of the first and second locomotives, and the processors of the first and second locomotives collectively formulate a control solution for actuation by the first and second locomotives.

10. The method of claim 9, wherein the processor located on each of the first and second locomotives compares its initial propulsion or braking value with any received initial propulsion or braking value from the other of the first and second locomotives if there is a discrepancy there between before determining the final propulsion or braking value or command.

11. The method of claim 9, wherein each of the first and second locomotives includes a location determining device and the processor located on each of the first and second locomotives communicates the location as part of the information to the other of the first and second locomotives and determines the propulsion or braking value or command using the sensed operational conditions, the pre-selected criteria, the determined location and the information received from the other of the first and second locomotives.

12. The method of claim 9, wherein each of the first and second locomotives includes a location determining device and a storage of track topology and the processor located on each of the first and second locomotives determines a propulsion or braking command using the topology of the present and projected location of that locomotive.

13. The method of claim 9, wherein the processor located on each of the first and second locomotives outputs the propulsion or braking command to the propulsion or braking systems as a control input.

14. The method of claim 9, wherein each of the first and second locomotives includes a display and the processor located on each of the first and second locomotives outputs the propulsion or braking value to the display.

15. The method of claim 9, wherein the operational conditions include one or more of speed, coupler forces, slack action, propulsion setting and braking setting.

16. The method of claim 9, wherein the processor located on each of the first and second locomotives includes a train dynamic model program to determine the propulsion or braking value or command and estimated train operational conditions using initial train parameters and the processor located on each of the first and second locomotives compares the sensed and the estimated operational conditions and adjusts the initial train parameter as necessary based on the comparison.

* * * * *